April 11, 1967  R. A. TRACY  3,313,989
THIN FILM AMPLIFYING APPARATUS AND METHOD
Filed Oct. 16, 1964

INVENTOR.
ROBERT A. TRACY
BY
Carl Fissell Jr.
AGENT

United States Patent Office 3,313,989
Patented Apr. 11, 1967

3,313,989
THIN FILM AMPLIFYING APPARATUS
AND METHOD
Robert A. Tracy, Castro Valley, Calif., assignor to Burroughs Corporation, Detroit, Mich., a corporation of Michigan
Filed Oct. 16, 1964, Ser. No. 404,367
7 Claims. (Cl. 317—234)

The present invention relates to quantum mechanical tunnel emission apparatus, and more particularly, although not necessarily exclusively, to space charge limited tunnel emission devices. With still more specificity, the invention relates to a three terminal tunnel emission device and to a method of producing a grid-like control element in a tunnel emission triode. Still more particularly, the invention has to do with a method of producing a thin film electrode grid structure which is compatible with and useful as the control element in a tunnel emission space charge limited triode.

It is an object of the present invention to provide a novel method for producing a thin film quantum mechanical tunnel emission triode structure.

Another object of the invention is to provide a grid-like control element for use with a thin film triode amplifying device.

Still another object of the invention is to provide a thin film space charge limited amplifying triode including a grid-like control element therefor by vacuum vapor deposition.

In accordance with the foregoing objects and first briefly described, the present invention comprises a tunnel emission or space charge limited triode where a metallic single crystal, e.g. aluminum is cut so as to provide a 1-1-0 face. Thereafter, the crystal is thermally oxidized to produce an aluminum oxide coating comprised of a plurality of lands and grooves, or hills and valleys. Conductive material is then deposited, as by evaporation techniques in vacua, at grazing angle to the lands between the grooves thereby to form elongated, parallel, spaced apart metal strips lying along the length of each land closely adjacent to each other. A conductive cross connecting strip is next deposited so as to interconnect each of the metallic film strips. Thereafter, an insulator is deposited over the conductive film strips and finally a metallic conductor is deposited over the insulator, thereby to form a metal-oxide-insulator-metal amplifying triode wherein the conductive metal strips form a grid-like control electrode for the apparatus.

These and other objects and advantages of the present invention will be set forth with more specificity as the invention is described and claimed in connection with the accompanying drawings wherein:

Up to the present time it has been difficult if not impossible to fabricate a simple and easily reproducible thin film triode in which one of the electrodes acts in the nature of a control grid simply because the dimensions involved are relatively impossible to control and maintain. Particularly difficult are the dimensions encountered with respect to the spacing thickness and width of conductors of the control element or so called grid. This element necessarily should be approximately the same order of magnitude of dimension as the distance from the cathode to the grid e.g. in the order of approximately 50 to 100 angstroms. It is almost impossible to get conductors which are this width by conventional and known techniques.

The present invention, however, involves a novel method wherein it is possible to produce grid conductors which are spaced on the order of 350 angstroms apart over an oxidized aluminum material which is from 50 to 300 angstroms in thickness. The thickness difference between the lands and grooves is on the order of 50 angstroms.

Figure 1:
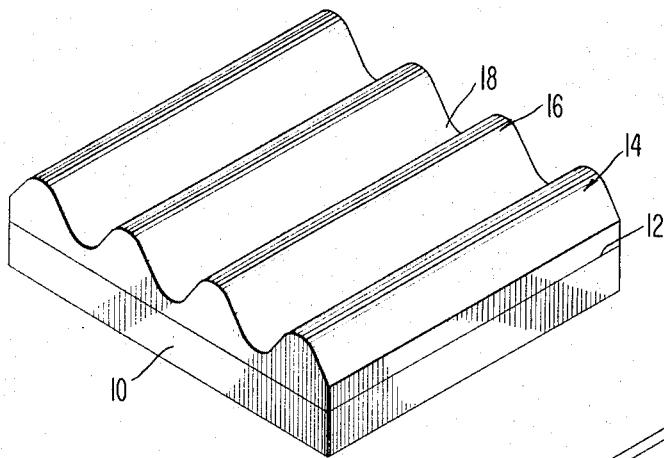
FIG. 1 is an isometric view of the structure of the present invention illustrating the land and groove arrangement of the oxidized layer.
Figure 2:
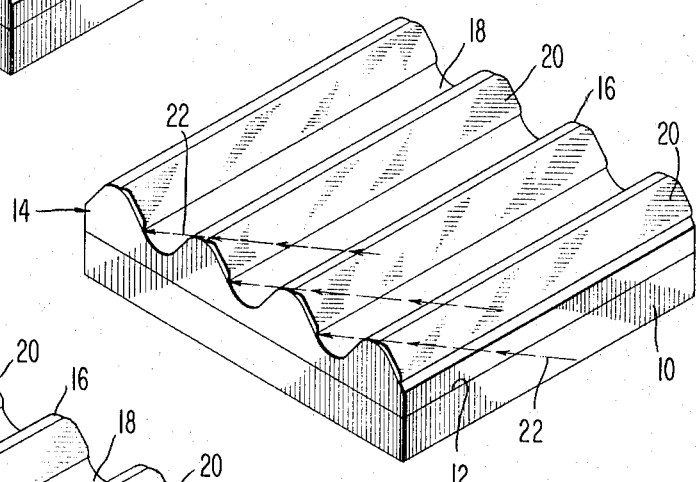
FIG. 2 is a view similar to FIG. 1 illustrating the metal film deposit along the lands of the oxidized portion of the device of FIG. 1.

The first step in the present method is to provide a single crystal of metal e.g. aluminum 10 which previously has been cut in such a manner as to provide the crystal with a so called 1-1-0 face 12. Thereafter, the aluminum single crystal is thermally oxidized at temperatures up to 400° C. in a furnace of suitable construction. The aluminum oxide lattice is larger than the aluminum lattice by approximately one percent. When the atoms in the oxide attempt to align themselves with the atoms in the aluminum distortion eventually causes a misfit or shift or lateral displacement of the aluminum oxide molecules in the oxide layer 14 with relation to the aluminum molecules in the crystal structure 10. Such so called misfit runs about one atom per hundred out of line whereby there is a build up of a thicker material structure in the areas where the atoms are out of line than where they line up. This displacement of the build up of the aluminum oxide atoms on the single crystal structure results in a land 16 and groove 18 (hill and valley or ribbed) arrangement, as seen in FIG. 1.

Figure 3:
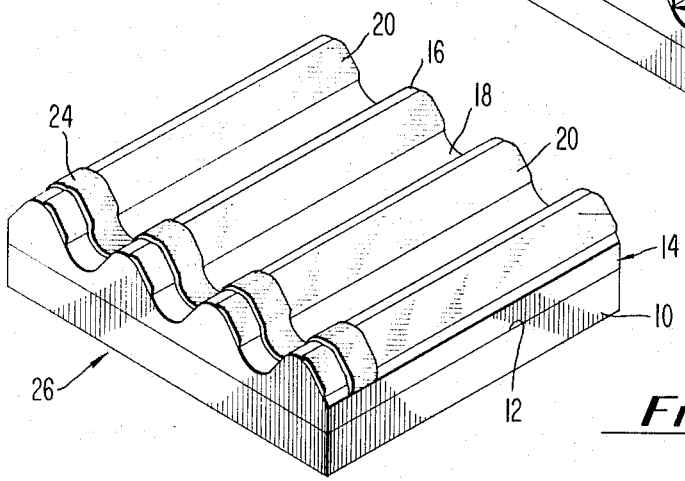
FIG. 3 is an isometric view of the completed control grid structure in accordance with the present invention.

The aluminum single crystal 10 carrying the oxidized land and groove areas on the surface thereof is next provided with a conductive film 20 e.g. by vacuum deposition, at a grazing angle 22 to the surface thereof so that the metal 20 deposits in a pattern of parallel, regular, spaced, elongated strips as seen in FIG. 3. By means of a suitable masking technique and vacuum deposition the grid lines 20 are interconnected by means of a common conductive connecting cross strip 24 providing the structure shown in FIG. 3.

Figure 4:
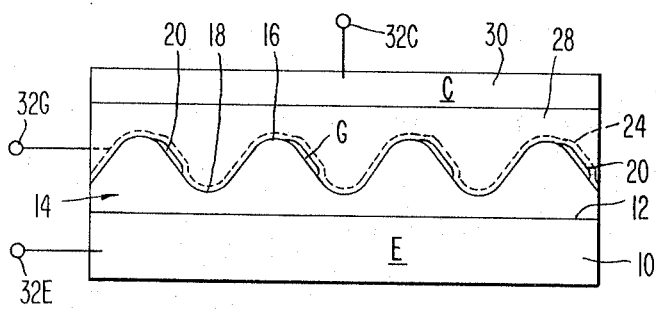
FIG. 4 is an end view of a portion of a complete triode amplifying device in accordance with the present invention.

Thereafter, the structure 26, thus developed, is provided with layer 28 of insulating material as seen in FIG. 4. Finally, the top surface of layer 28 is provided with a metallic conductor 30 so as to form a three element device having an emitter (aluminum single crystal) a grid control electrode and a collector. Leads 32C, 32G, and 32E provide means for applying suitable energizing and control potentials to the device from a source not shown.

The novel method of the invention is such that the metallic deposition steps, etc. can be controlled to provide an accurate spacing of the grid conductors of an accuracy not heretofore attainable for use with tunnel emission and space charge limited three element devices (triodes).

What is claimed is:

1. The method of fabricating quantum mechanical tunneling apparatus comprising the steps of:
    (a) providing a monocrystalline metallic structure with a 1–1–0 face,
    (b) oxidizing said 1–1–0 face in such manner as to cause the crystalline lattice of said structure to be displaced relative to the crystalline lattice of the oxide material and produce an undulating but repeating surface pattern,
    (c) applying a metallic coating to similar portions of said surface pattern undulations thereby forming parallel spaced apart metallic rows of conductive material,
    (d) interconnecting said rows with conductive material,
    (e) applying an insulating material layer over said rows and said conductive interconnecting material, and,
    (f) applying a layer of electrically conductive material to said insulating material thereby to provide a three terminal amplifying device.

2. The method of fabricating quantum mechanical tunneling apparatus comprising the steps of:
    (a) providing a single crystal of aluminum with a 1–1–0 face,
    (b) oxidizing said face in such manner as to cause the crystalline lattice of said aluminum to be displaced relative to the crystalline lattice of the oxide material and produce an undulating but repeating surface pattern,
    (c) applying a metallic coating at a predetermined angle to similar portions of said surface pattern undulations thereby forming parallel spaced apart metallic rows of conductive material,
    (d) interconnecting said rows with conductive material,
    (e) applying a layer of insulating material over said rows and said conductive interconnecting material, said predetermined angle being depthwise relative to said layers and having a transverse component relative to said undulating pattern, and
    (f) applying a layer of electrically conductive material to said insulating material thereby to provide a three terminal amplifying device.

3. The method of fabricating quantum mechanical tunneling apparatus comprising the steps of:
    (a) providing a single crystal of aluminum with a 1–1–0 face,
    (b) oxidizing said face in such manner as to cause the crystalline lattice of said aluminum to be displaced relative to the crystalline lattice of the oxide material and produce an undulating but repeating surface pattern,
    (c) applying a metallic coating at a predetermined angle to similar portions of said surface pattern undulations thereby forming parallel spaced apart metallic rows of conductive material,
    (d) interconnecting said rows with conductive material,
    (e) vacuum depositing an insulating material layer over said rows and said conductive interconnecting material,
    (f) applying a layer of electrically conductive material to said insulating material, said predetermined angle being depthwise relative to said layers and having a transverse component relative to said undulating pattern, and,
    (g) securing electrical conductors to said aluminum, said interconnecting material and said last named conductive material providing means for applying electrical potentials thereto.

4. The method of fabricating quantum mechanical tunneling apparatus comprising the steps of:
    (a) providing a single crystal of aluminum,
    (b) producing a 1–1–0 face upon said crystal of aluminum,
    (c) oxidizing said face in such manner as to cause the crystalline lattice of said aluminum crystal to be displaced relative to the crystalline lattice of the anodized material and produce a land and groove repeating surface pattern,
    (d) applying a metallic coating at a predetermined grazing angle to similar portions of said surface pattern undulations thereby forming parallel spaced apart rows of conductive material,
    (e) interconnecting said rows with deposited conductive material,
    (f) depositing an insulating material layer over said rows and said conductive interconnecting material,
    (g) applying an electrically conductive layer material over said insulating material thereby to provide a three terminal amplifying device, said predetermined angle being depthwise relative to said layers and having a transverse component relative to said undulating pattern, and,
    (h) providing a plurality of electrical conductive leads for said apparatus for the application of electrical energizing and control potentials thereto.

5. Quantum mechanical tunneling apparatus comprising:
    (a) a monocrystalline metallic structure having a 1–1–0 face,
    (b) said 1–1–0 face being oxidized in such manner as to cause the crystalline lattice of said structure to be displaced relative to the crystalline lattice of the oxide material and produce an undulating but repeating surface pattern,
    (c) a metallic coating disposed on similar portions of said surface pattern undulations thereby forming parallel spaced apart metallic rows of conductive material,
    (d) said rows being electrically interconnected with conductive material,
    (e) insulating material disposed in a layer over said rows and said conductive interconnecting material, and,
    (f) electrically conductive material in a layer overlying said insulating material.

6. Quantum mechanical tunneling apparatus comprising:
    (a) a single crystal of aluminum,
    (b) said crystal being provided with a 1–1–0 face,
    (c) said face being anodized in such manner as to cause the crystalline lattice of said aluminum crystal to be displaced relative to the crystalline lattice of the anodized material and produce an undulating but repeating surface pattern,
    (d) a metallic coating applied at a predetermined grazing angle to similar portions of said surface pattern undulations thereby forming parallel spaced apart rows of conductive material,
    (e) conductive material interconnecting said rows,
    (f) insulating material deposited in a layer over said rows and said conductive interconnecting material,
    (g) electrically conductive material coated in a layer over said insulating material, said predetermined angle being depthwise relative to said layers and having a transverse component relative to said undulating pattern, and,
    (h) means for applying suitable electrical potentials to said apparatus thereby to provide a three terminal amplifying device.

7. Quantum mechanical tunneling amplifying apparatus comprising:
    (a) a single crystal of aluminum with a 1–1–0 face,
    (b) said face being anodized in such manner as to cause the crystalline lattice of said aluminum to be displaced relative to the crystalline lattice of the oxide material and produce an undulating but repeating surface pattern, (c) a metallic coating disposed at a predetermined angle on similar portions of said surface pattern undulations thereby forming parallel spaced apart metallic rows of conductive material, (d) said rows being interconnected with conductive material, (e) a layer of insulating material overlying said rows and said conductive interconnecting material, (f) a layer of electrically conductive material in surface contact with said insulating material, said predetermined angle being depthwise relative to said layers and having a transverse component relative to said undulating pattern, and, (g) electrical conductors secured to said aluminum, said interconnecting material and said last named conductive material providing means for applying suitable electrical potentials thereto.

References Cited by the Examiner
UNITED STATES PATENTS 3,056,073  9/1962  Mead _____ 317—234

JOHN F. CAMPBELL, *Primary Examiner.*

WILLIAM I. BROOKS, *Examiners.*